Figure 1:
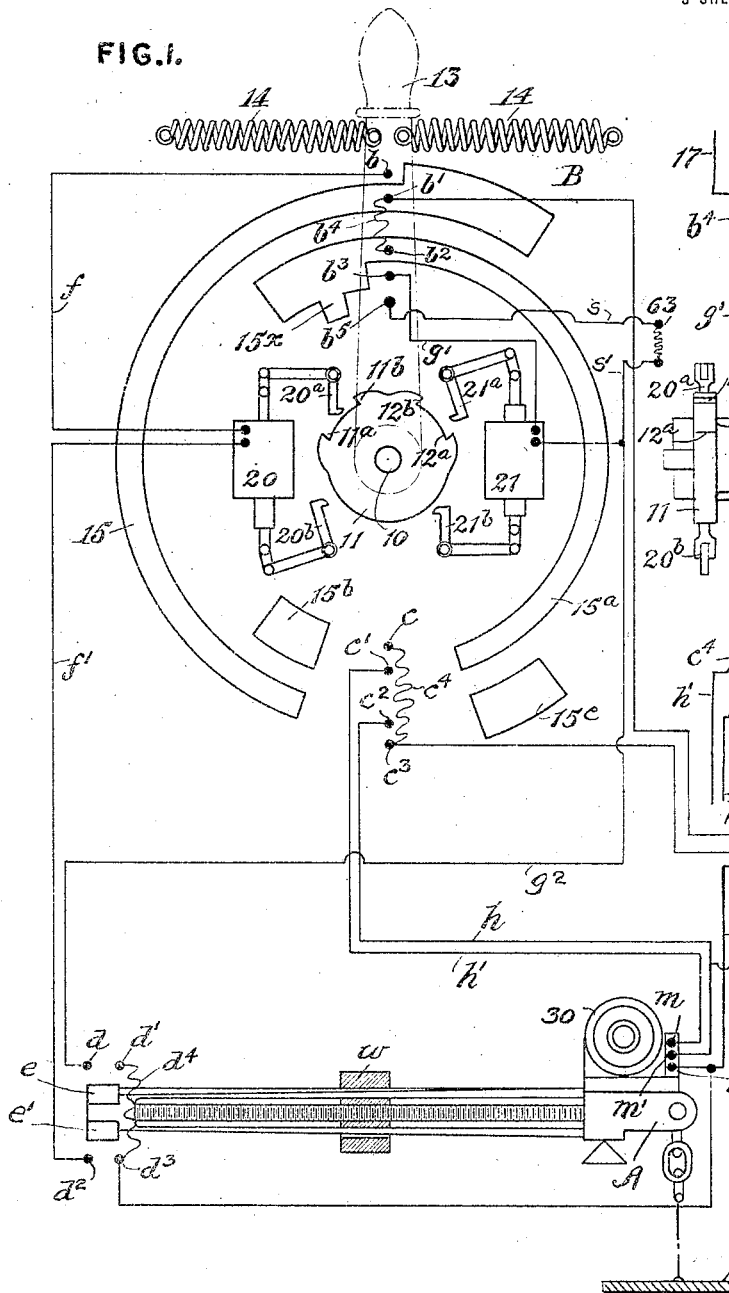

H. A. CARPENTER & A. W. WARNER.
COMPUTING WEIGHING APPARATUS.
APPLICATION FILED JULY 10, 1914.

1,156,864.

Patented Oct. 12, 1915.
3 SHEETS—SHEET 1.

WITNESSES
F. E. Gaithers.
Ella McConnell

INVENTORS
Henry A. Carpenter
Arthur W. Warner
by Nestika Doolittle
Attorneys.

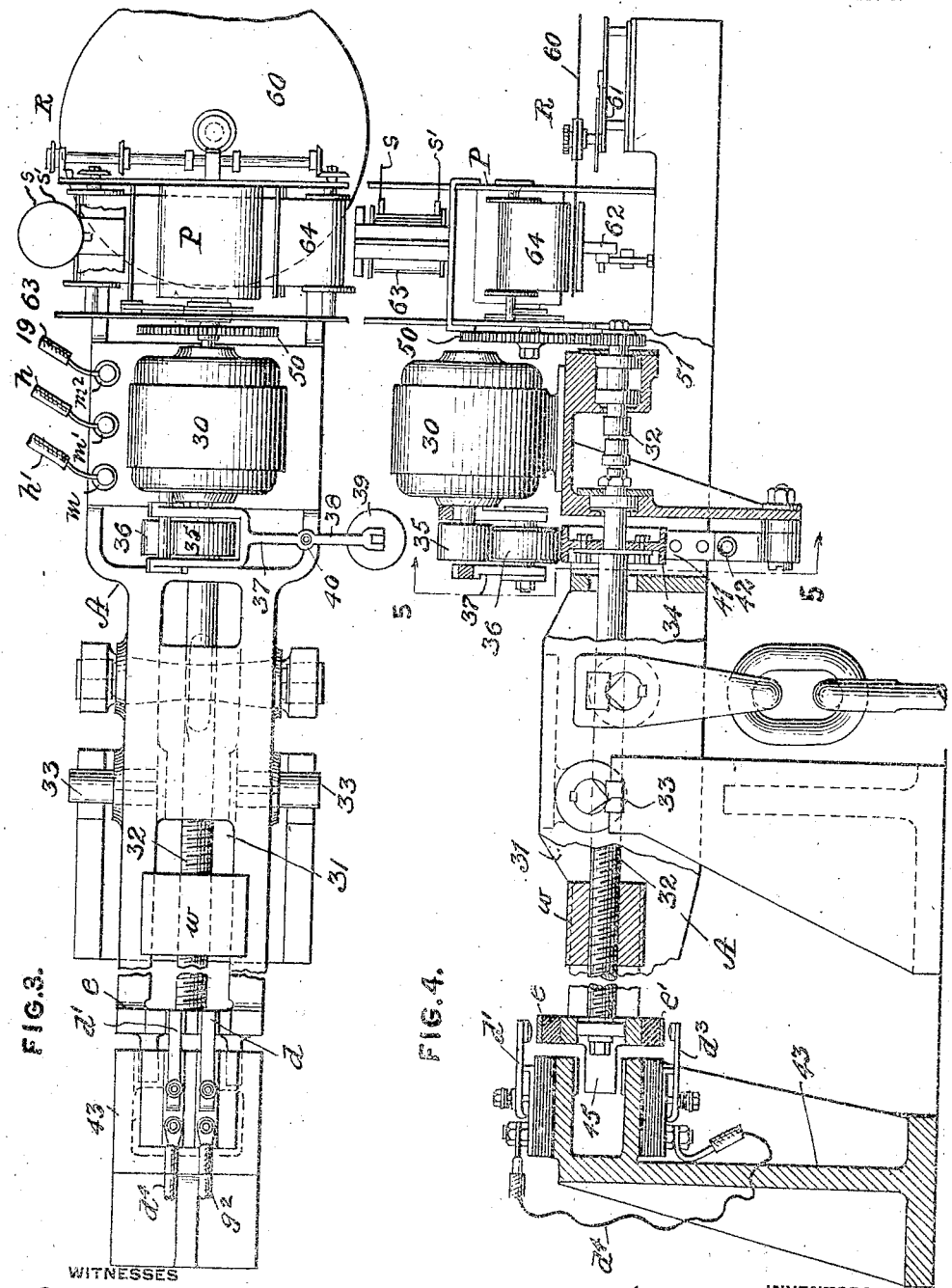

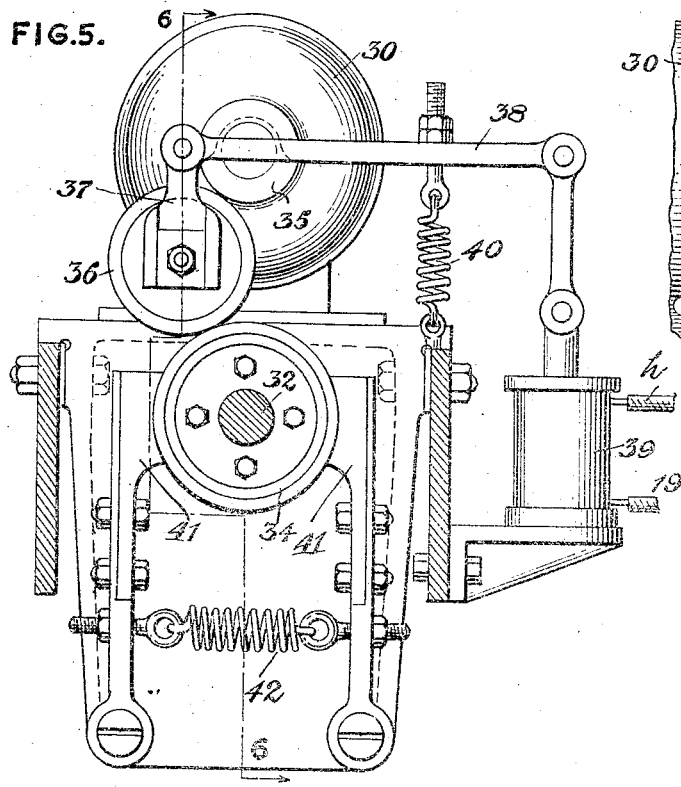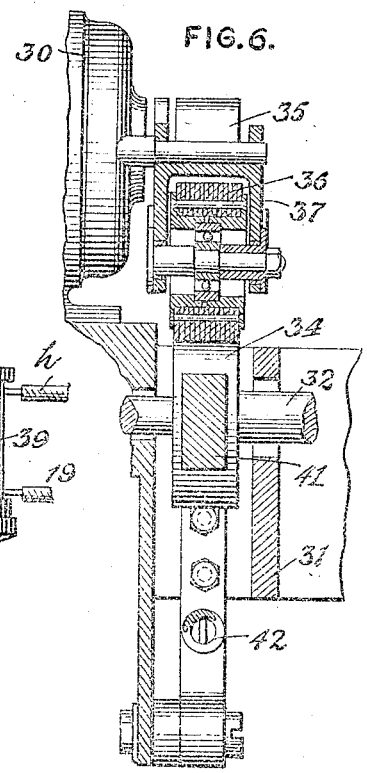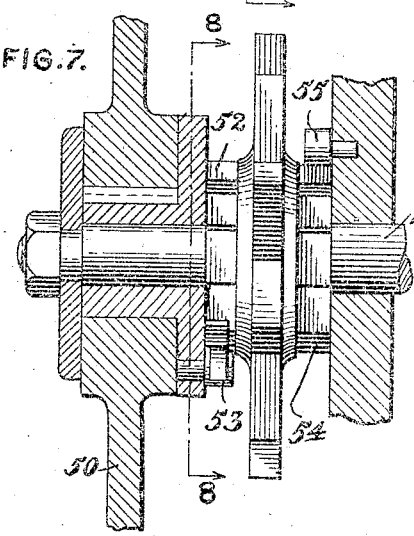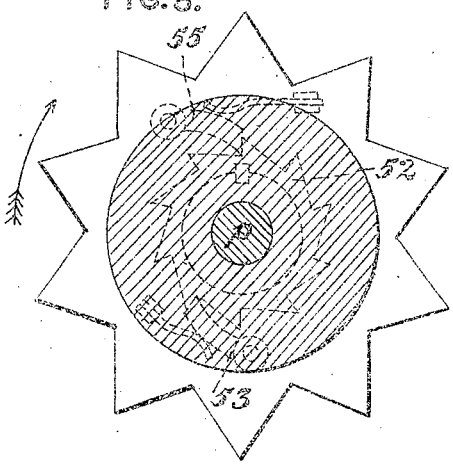

UNITED STATES PATENT OFFICE.

HENRY A. CARPENTER AND ARTHUR W. WARNER, OF SEWICKLEY, PENNSYLVANIA, ASSIGNORS TO RITER-CONLEY MANUFACTURING COMPANY, OF PITTSBURGH, PENNSYLVANIA, A CORPORATION OF NEW JERSEY.

COMPUTING WEIGHING APPARATUS.

1,156,864.  Specification of Letters Patent.  Patented Oct. 12, 1915.

Application filed July 10, 1914. Serial No. 850,209.

*To all whom it may concern:*

Be it known that we, HENRY A. CARPENTER and ARTHUR W. WARNER, citizens of the United States, residing at Sewickley, in the county of Allegheny and State of Pennsylvania, have invented certain new and useful Improvements in Computing Weighing Apparatus, of which the following is a specification.

Our present invention relates to improvements in computing weighing apparatus relating more particularly to apparatus in which loads of considerable bulk are accurately weighed, registered, and, if desired, recorded.

In weighing operations, and especially where the load is of large bulk, as for instance, the charge for the retorts of a gas bench, it is essential that a record of the weighing operations be obtained and in such form as to enable the net weight of a charge to be readily determined. Heretofore this has generally been provided by clerical work of the scale operator, upon whose careful work and attention the accuracy of the record depends. In making these records it is generally the practice to record both gross and tare weights from which calculations must be made to ascertain the weight of the individual charge and of the totality of charges for the day.

The present invention is designed for the purpose of eliminating the human element as much as possible, thereby insuring a correct and complete record of the material which is actually used.

Among the objects of our invention are: (*a*) To provide a weighing apparatus in which the movements of the weight are controlled from a single point which may, if desired, be removed from the balancing mechanism. (*b*) To provide apparatus of this type in which the tripping mechanism for controlling the movements of the weight in opposite directions will be limited to render the mechanism active to move the weight in only the proper direction, the tripping mechanism being locked against action which would move the weight in the improper direction. (*c*) To provide a weighing mechanism in which the movement of the weight may be had with rapidity, but which will be substantially free from overrunning, thereby providing for accurate weighing. (*d*) To provide a computing weighing apparatus in which the movements of the weight are rapidly made, and in which the weight movements operate an accumulative counter mechanism in a manner to provide registration of the net weight, these operations being controlled from a single point. (*e*) To provide apparatus of this character in which the balancing movements of the weight provide net weight registration, and in which these registrations may be recorded to visually indicate successive accumulative weights and, if desired, the particular time at which the net weight record is made.

Other and further objects are to provide apparatus of this character which is simple and efficient in operation, substantially automatic, which prevent computation errors, and in which the labor is reduced to a minimum.

To these and other ends, the nature of which will be readily understood as the invention is hereinafter disclosed, said invention consists of the improved construction and combination of parts hereinafter fully described, illustrated in the accompanying drawings, and more particularly pointed out in the appended claims.

Figure 2:
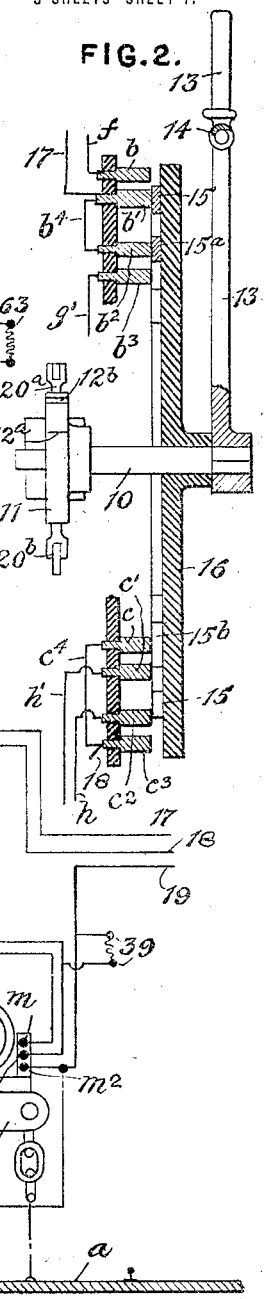

In the accompanying drawings, in which similar reference characters indicate similar parts in each of the views, Figure 1 is a diagrammatic view showing the general arrangement of portions of the apparatus employed in producing the desired result according to the present invention; Fig. 2 is a vertical section taken through a simple form of switch mechanism which may be employed for the purpose of carrying out the invention; Fig. 3 is a top plan view, partly broken away, of a scale beam structure which may be employed; Fig. 4 is a view partly in side elevation and partly in section of the structure of Fig. 3; Fig. 5 is a sectional view taken on the line 5—5 of Fig. 4; Fig. 6 is a sectional view taken on the line 6—6 of Fig. 5; Fig. 7 is a detail sectional view of the ratchet mechanism for operating the counter; and Fig. 8 is a sectional view taken on the line 8—8 of Fig. 7.

Referring more particularly to Fig. 1, A indicates a scale beam operatively connected to the platform *a* of a scale; the scale beam in this view is shown simply in diagrammatic form, a preferred structure thereof being shown in Figs. 3 to 8 inclusive; the showing of Fig. 1, however, will be sufficient to illustrate the general weighing operation.

B represents diagrammatically a switch mechanism which may be employed, Fig. 2 showing a simple form of mechanism for this purpose.

10 designates a shaft carrying a controlling member 11 provided with shoulders $11^a$, $11^b$, $12^a$ and $12^b$, the shaft being adapted to be oscillated by means of a handle 13, the latter being held in a normal intermediate position by means of springs 14.

15, $15^a$, $15^b$ and $15^c$ designate movable conductors for the purpose of making and breaking certain circuits presently described, these conductors, for the purpose of illustration, being shown as plates or strips attached to an insulating carrier 16 mounted on the shaft 10 (Fig. 2), these conductors being adapted to be moved in unison with the movements of the handle 13.

17, 18 and 19 indicate leads which are adapted to provide the electrical operation of the apparatus, these leads being shown as part of a three-phase electrical system.

$b$, $b'$, $b^2$ and $b^3$ designate contacts with which the conductors 15 and $15^a$ are adapted to coöperate; these contacts may be considered as the selecting and locking contacts.

$c$, $c'$, $c^2$ and $c^3$ indicate contacts which are also adapted to coöperate with the conductors 15 and $15^a$ as well as conductors $15^b$ and $15^c$; these contacts may be considered as the motor circuit contacts. Contacts $b'$ and $b^2$ are permanently connected by a fixed conductor $b^4$ while contacts $c$ and $c^3$ are connected by a fixed conductor $c^4$. The conductor 15 is formed to provide a constant contact engagement with contact $b'$, and also to have contact engagement with contact $b$ when moved a suitable distance in one direction, this latter contact engagement acting to bridge the contacts $b$ and $b'$; this conductor also, upon further movement in the same direction, will provide contact engagement with the contact $c^2$, in which position, this conductor is in contact engagement with each of these contacts. Conductor $15^a$ is in permanent contact engagement with the contact $b^2$, and is formed to provide contact engagement with contact $b^3$ when the handle 13 has been moved in the opposite direction a suitable distance, thus bridging contacts $b^2$ and $b^3$; this conductor, upon continuation of its movement in the same direction is adapted to provide contact engagement with contact $c'$, thus forming a conductor in contact engagement with contacts $b^2$, $b^3$ and $c'$. Conductor $15^b$ operates only in connection with contacts $c$ and $c'$, being adapted to bridge these contacts when the conductor 15 is in contact engagement with contact $c^2$; conductor $15^c$ coöperates with contacts $c^2$ and $c^3$ acting to bridge these contacts when conductor $15^a$ is in contact engagement with contact $c'$.

$d$, $d'$, $d^2$ and $d^3$ indicate contacts adapted to coöperate with contact members $e$ and $e'$ carried by the scale beam, the contacts $d'$ and $d^3$ being connected by a fixed conductor $d^4$, while contacts $d$ and $d'$ are adapted to be bridged by member $e$, and the contacts $d^2$ and $d^3$ by the contact member $e'$.

20 and 21 designate solenoids, each having pivotally mounted fingers forming latches, the core of solenoid 20 carrying an upper finger $20^a$ and a lower finger $20^b$; the fingers of the core of solenoid 21 are correspondingly indicated at $21^a$ and $21^b$. The fingers $20^a$ and $21^a$ are adapted to coöperate with the shoulders $11^b$ and $12^b$ respectively, these fingers lying in the path of travel of these shoulders when the solenoids are inactive, and acting as stop or latch members to prevent movement of the handle 13 beyond a fixed distance. The fingers $20^b$ and $21^b$ are adapted to coact with the shoulders $11^a$ and $12^a$. The fingers $20^a$ and $21^a$ are so arranged that when a solenoid is energized, its particular finger $20^a$ or $21^a$ will be withdrawn from the path of travel of its coöperating shoulder to permit of a further movement of the member 11 in the same direction, this movement of the member being continued until the other finger of the energized solenoid engages with its coöperative shoulder. For instance, if the solenoid 20 be energized, the movement of the solenoid core upwardly will move the finger $20^a$ out of the path of travel of the shoulder $11^b$, while at the same time, the finger $20^b$ will be moved to a position where it will engage the shoulder $11^a$ when the latter has moved to proper position under the actuation of the handle, the engagement of the finger $20^b$ with the shoulder $11^a$ locking the handle against return movement, this locking engagement being retained until the circuit is broken through the solenoid, whereupon the solenoid core drops, releasing the finger $20^b$ and moving the finger $20^a$ into the path of shoulder $11^b$, the member 11 being returned to normal position through the action of the springs 14. The relative positions of the fingers $20^a$ and $21^a$ and shoulders $11^b$ and $12^b$ are such that the handle may move a distance sufficient to bridge contacts $b$ and $b'$ or $b^2$ and $b^3$ depending upon the direction of movement of the handle. In Fig. 1, the solenoid 20 is shown in its deënergized position, while solenoid 21 is shown as energized, the latter being shown in the position it would assume when handle 13 is moved toward the right, this solenoid 21 being normally in the position shown by solenoid 20.

The various circuit connections for the solenoids are as follows: The lead 17 is connected to contact $b'$; contact $b$ is connected to contact $d^2$ through leads $f$, $f'$ connected to binding posts of the solenoid 20, and contact $d^3$ is connected to the line lead 19. Contact $b^3$ is connected to contact $d$ through solenoid 21 by leads $g'$ and $g^2$.

It being assumed that the scale beam is in its lower position with the contact member $e'$ bridging contacts $d^2$ and $d^3$, the following operations take place when it is desired to energize the solenoids. Should the operator move the handle toward the right of Fig. 1, a sufficient movement will be had to bridge contacts $b^2$ and $b^3$ before the latch $21^a$ engages shoulder $12^b$, it being understood that both solenoids are deënergized, and that the latches of solenoid 21 are in the same relative positions as the latches of the solenoid 20. While these two contacts are thus bridged by the conductor $15^a$, it will be found that the circuit through solenoid 21 remains broken because of the gap between the contacts $d$ and $d'$ of the scale beam, and since the solenoid 21 is not energized, further movement in that direction by the handle is effectively prevented. The operator then swings the handle toward the left, the result being that the conductor 15 bridges contacts $b$ and $b'$; since the gap between contacts $d^2$ and $d^3$ is bridged by contact member $e'$, the circuit through solenoid 20 is completed through lead 17, contact $b'$, conductor 15, contact $b$, lead $f$, solenoid 20, lead $f'$, contact $d^2$, contact member $e'$, contact $d^3$, to lead 19. The solenoid is thus energized, removing the finger $20^a$ out of the path of shoulder $11^b$ permitting the member 11 to continue its movement a distance sufficient to provide engagement of finger $20^b$ with shoulder $11^a$ (the position of solenoid 21 in Fig. 1); this position will be maintained until the circuit is broken through the solenoid by raising the scale beam so as to form a gap between contacts $d^2$ and $d^3$, whereupon the parts of the switch mechanism will return to normal position.

During the additional movement of the handle to provide the latch engagement of finger $20^b$, the conductors 15 and $15^b$ pass into contact engagement with contacts $c$, $c'$ and $c^2$ resulting in completing the motor circuit, this circuit being completed through lead 17, contact $b'$, conductor 15, contact $c^2$, lead $h$, to binding post $m'$ of a motor 30; lead 18 being connected to contact $c^3$, this particular lead will have its circuit to the motor completed through conductor $c^4$, contact $c$, conductor $15^b$, contact $c'$, and lead $h'$; to binding post $m$ of the motor; lead 19 is connected to the motor through binding post $m^2$. As a result, as soon as the handle is moved a sufficient distance to lock it by the latch $20^b$, the motor circuit will be completed, and the motor will have its movement in one direction, which, through connections presently described, acts to move a weight $w$ on the scale beam inward until the balance of load and weight becomes effective to raise the scale beam, thus breaking the solenoid circuit, releasing the latching engagement, and returning the handle to normal position, which in turn breaks the motor circuit. If additional weight be now added to the load on the scale $a$, the scale beam will rise and thus bridge the contacts $d$ and $d'$ by the contact member $e$. By bridging this gap, the solenoid 21 may be energized by swinging the handle 13 toward the right, the solenoid circuit being completed from lead 17, contact $b'$, conductor $b^4$, contact $b^2$, conductor $15^a$, contact $b^3$, lead $g'$, solenoid 21, lead $g^2$, contact $d$, contact member $e$, contact $d'$, conductor $d^4$, contact $d^3$, to lead 19, thus energizing solenoid 21, releasing the latch $21^a$ and permitting the member 11 to continue a movement sufficient to latch it by the latch $21^b$, this movement causing conductors $15^a$ and $15^c$ to have contact engagement with contacts $c'$, $c^2$ and $c^3$, and thus completing the motor circuit as follows: lead 17, contact $b'$, conductor $b^4$, contact $b^2$, conductor $15^a$, contact $c'$, lead $h'$ to binding post $m$ of the motor; lead 18, contact $c^3$, conductor $15^c$, contact $c^2$, lead $h$ to binding post $m'$; the lead 19 being connected to the binding post $m^2$. As will be seen, this particular circuit is the reverse of that which was provided when the lever was moved to the left; and as a result, the motor 30 will travel in the opposite direction resulting in moving the weight $w$ outwardly until balance is restored, whereupon the contact member $e$ is moved to break the solenoid circuit at contacts $d$ and $d'$, deënergizing the solenoid 21 to permit the handle to resume its normal position, which movement results in breaking the motor circuit.

As will be readily understood, this general arrangement provides for a succession of operations which follows the usual loading and unloading operations of a load, with the weighing operation taking place before and after discharge of the load.

Assuming the weight $w$ to be at the right of the scale beam and with the beam balanced through the absence of a load, the placing of a load on the scale $a$ will cause the beam to rise and bridge the gap between contacts $d$ and $d'$, placing the apparatus in condition for weighing the load. Should the operator attempt to throw the handle toward the left, the latch $20^a$ will prevent a complete movement through failure of the solenoid 20 to be energized, as heretofore explained; he then moves the handle to the right, completes the motor circuit which then, through its connections with the weight, moves the weight outwardly on the scale beam until a state of balance is reached, thus breaking the solenoid and motor circuits and stopping the weight in this position. If all the load is now removed from the scale, the scale beam will drop, bridging the contacts $d^2$ and $d^3$ permitting the proper solenoid and motor circuits to be completed to provide a movement of the weight in the opposite direction. As will be obvious, this movement of the handle is limited to one direction, viz., a direction to move the weight to balanced position. If but a part of the load is removed, the return movement of the weight will be but a partial distance, so that the difference in readings of the two positions of the weight will indicate the weight of the material which was taken from the load.

The particular structure of the scale beam so far as heretofore referred to, is shown more particularly in Figs. 3, 4, 5, and 6 in which the beam is shown as formed with a channel 31 through which extends a threaded rod 32 held against endwise movement. Said rod extends past the knife edge balance point 33 and is provided with a wheel 34 forming a drive wheel for the rod, the driving action being obtained from a wheel 35 mounted on the shaft of motor 30, the driving connection between the wheels 35 and 32 being through an idler 36 carried by a rocker frame 37, said frame having an arm 38 connected to the core of a solenoid 39, said frame being pivotally supported in such manner that idler 36 will be brought into frictional contact with the wheels 34 and 35 when the solenoid is energized and the arm 38 raised; disengagement of the idler from said wheels is provided by a spring 40 connecting the arm 38 with the scale beam, the purpose being to provide for a rapid movement to destroy the frictional engagement when the circuit is broken through the solenoid. The object of this is to prevent over-running of the weight by the kinetic energy of the motor after the circuit through the motor has been broken. This over-running of the weight is further prevented by the use of brake shoes 41 which are adapted to contact with the periphery of wheel 34, these shoes being held under tension by a spring 42 connecting them, the result being that breaking of the circuit through the solenoid and the motor acts to stop rotation of the rod 32 and consequently retains the weight $w$ (which is threaded on the rod) in proper position.

As will be obvious, a completion of the circuit through the motor and through the solenoid 39 causes the motor to begin rotation (the direction being determined by the connections of leads $h$ and $h'$), and energizes solenoid 39 bringing the idler 36 into frictional engagement with the wheels 34 and 35, thereby rotating the rod 32 and threading the weight $w$ lengthwise of the scale beam depending upon the direction of rotation of the rod.

The contacts $d$, $d'$, $d^2$ and $d^3$ are carried by a bracket 43, as indicated in Figs. 3 and 4, these contacts being preferably yieldably mounted to insure proper contact engagement and prevent injury thereto during the movement of the scale beam. To prevent excessive movement of the beam, the bracket 43 is provided with a recess into which a projection 45 on the end of the scale beam extends, this projection being adapted to contact with faces at opposite extremes of its movement. The contact members $e$ and $e'$ are carried by the scale beam and insulated therefrom so as to make the proper contact engagement with their respective contacts, the pairs of contacts being preferably arranged side by side as shown in Fig. 3.

As will be readily understood, this particular construction and arrangement of the scale beam provides for substantially automatic, accurate and efficient weighing action by means of which the various weights can be readily determined. The weighing operation is provided by a single lever, the movement of which has the effect to carry the weight from one position to another on the scale beam, the mechanism being so arranged that the operator is unable to provide this movement in any but the proper direction, thus providing for simple manipulation but in a manner which renders possibility of error in this respect impossible. However, the present invention is designed to also decrease the possibility of computation errors, and to provide this, additional mechanism is provided by means of which the readings of the scale are dispensed with and a record automatically made of the weighing operations, this being provided by a mechanism presently described.

As heretofore pointed out, the principal information desired in operations such as above referred to in connection with the manufacture of gas, is the weight of the material which is actually employed; in other words, the weight of the material which is placed in the retorts. To obtain this, we employ a registering mechanism, and, if desired, a recording mechanism for recording the record of the registering mechanism.

In view of the fact that the essential record is the weight of the material which is used, we arrange the operating connections between the traveling weight and the registering mechanism in such manner that the change of the weight from one position to another in one direction only actuates the registering mechanism, thus enabling the use of an accumulating counter which registers the individual accumulations so that at the end of any desired period, the difference between the first and last registration will indicate the totality of net weights during the period. To provide this result, the following mechanism is employed.

P designates a registering counter of any preferred construction having a shaft $p$ adapted, when moved in one direction, to actuate the counting mechanism, said shaft being adapted to be driven by a suitable gear 50 by means of ratchet mechanism more particularly shown in Figs. 7 and 8, said gear being operatively connected with a gear 51 driven by the threaded rod 32, the gear connections being so arranged that the rotation of the rod to move the weight along the rod causes the counting mechanism to be actuated in correspondence with the travel of the weight to indicate pound by pound changes in position in the proper direction of movement of the weight.

The ratchet mechanism includes a ratchet wheel 52 carried by the shaft, a pawl 53 adapted to travel with the gear 50, a second ratchet wheel 54 also carried by the shaft, and a second pawl 55 carried by the framework of the machine, it being understood that the pawls are adapted to be held in engagement with the ratchet wheel by springs or other suitable means. By this construction, it will be readily understood that as the gear 50 is driven by the threaded rod, the rotation of the gear, if the direction of travel be as shown by the arrow in Fig. 8, will cause a rotation of the shaft $p$ through the action of the pawl 53, the pawl 55 riding over the ratchet teeth of wheel 54 during this movement. When the direction of rotation of the gear 50 is reversed, the pawl 53 will ride on the ratchet teeth of wheel 52 and pawl 55 will act to retain the counting mechanism against return movement through its engagement with a tooth of wheel 54. In this manner, the travel of the weight in one direction will actuate the counting mechanism while its movement in the opposite direction will be ineffective to change the registration record.

By employing a recording mechanism indicated conventionally at R in Figs. 3 and 4, the reading of the counter may be transferred to a record element such as a disk 60 which may be actuated by clock train 61, said disk having a path of movement underlying the registering mechanism whereby it can be brought into contact with the registering disks by the use of a hammer 62 adapted to be actuated by a solenoid structure 63; an inking ribbon 64 may be employed for producing the record on the disk. If the disk 60 be provided with divisions representing time, it will be readily understood that when the solenoid 63 is actuated, the registered amount will not only be stamped upon the disk 60, but the time of stamping will be indicated by reason of the travel of the disk placing the time indication at the proper position, thus not only securing a record of the weighing operations, but also a record of the time when these operations take place, so that an inspection of the disk will show the time when the retorts were successively charged, as well as the amount of material which was charged at the time, this amount being ascertained by computing the difference between the amount registered in the preceding operation and the registry of the amount forming the charge.

In view of the fact that although the travel of the weight $w$ is rapid, due to the motor operation, it will be understood that the particular structural connection between the motor and the threaded rod 32 is such that the movement of the weight ceases with the breaking of the motor circuit, so that liability of over-running by the weight is practically eliminated, the result being that the position of the weight at the breaking of the motor circuit is an accurate representation of the weight of the load. This fact is also important in connection with the registering mechanism, in that the instant stopping of the movement of the threaded rod results in preventing excessive movement of the counting mechanism, so that an accurate registration is had. This fact enables the use of more compact registration mechanism inasmuch as a question of overrunning need not be considered.

Assuming that the apparatus disclosed herein is installed for the purpose of providing an accurate record of the weight of the material being charged to the gas retorts during a predetermined period, the operation would be as follows, it being assumed that a previous charge has been registered and that the receptacle for the material (coal) may not be entirely emptied by the preceding charge so that the tare weight includes not only the receptacle but also the remaining coal from the previous charge; under such assumption the weight $w$ would occupy an intermediate position on the scale beam, such, for instance, as shown in Fig. 1, the scale beam being then in balance.

The receptacle is supplied with an additional quantity of coal which has the effect of raising the outer end of the scale beam and thereby closing the gap between contacts $d$ and $d'$. The operator then moves the handle 13, the movement of which is limited toward the right in Fig. 1 through the inability of movement to the left by reason of the latch $20^a$, thereby completing the motor circuit through the operations heretofore described, starting the motor and bringing the idler 36 into engagement with wheels 34 and 35 through the operation of the solenoid 39, the result being that the weight $w$ is moved outwardly toward the end of the beam until balance is obtained, whereupon the circuit is broken through the movement of the contact member $e$ out of engagement with contacts $d$ and $d'$. During this outward movement, the rotation of the rod 32 is ineffective on the counting mechanism by reason of the fact that the pawl 53 rides on the teeth of ratchet wheel 52, pawl 55 retaining the counting mechanism against return movement. The distance traveled by the weight in changing from one position to the other is immaterial, since the amount of coal added to the tare weight is immaterial. Obviously, the disengagement of the idler 36 from contact with wheel 34 in connection with the braking effect of the shoes 41, has positioned the weight $w$ at the proper point where it is retained from change by reason of the frictional engagement of the wheel 34 and shoes 41. The receptacle is then moved to the retort and the latter charged, after which it is returned to the scale, with the uncharged coal therein.

Inasmuch as the weight $w$ was in balance with the heavier load, the lighter load will be unable to raise the beam from its lower position with the contact member $c'$ in contact engagement with the contacts $d^2$, $d^3$. Consequently, one of the gaps of the motor circuit is bridged, making it possible to energize a solenoid and thus close the motor circuit. With the apparatus in this condition, the operator then moves the handle in the direction opposite to that previously employed (movement in the same direction being prevented as heretofore explained), thus energizing the solenoid 20 and closing the motor circuit to drive the motor in the opposite direction, the result being that the weight $w$ will be moved inwardly until the beam again assumes a balanced condition when the circuit is broken through the breaking of the contact engagement between contact member $c'$ and contacts $d^2$, $d^3$. This inward travel of the weight, due to the rotation of the rod 32 in the opposite direction, has caused the shaft $p$ to be actuated through the drive engagement of the pawl 53 with ratchet 52, and since the counting mechanism has a synchronous relation with the movement of the weight $w$ to translate the movement of the weight in a pound for pound manner, the counting mechanism will be moved to add the translated weight to the previous accumulations, with the result that an inspection of the counting mechanism will disclose an amount representing the totality of individual countings provided by successive charges, the amount of the individual charge just made being readily ascertained by comparing the registered amount with the preceding record.

If the recording mechanism is employed, the amount appearing on the counting register will be recorded on the disk 60 by manipulating the hammer 62, thus providing a printed indication of the state of the register at this time, and if the disk is a time-controlled one, the position of the record will be at the proper time indicated on the disk 60. If the disk be adapted to provide a record for a period of say twenty-four hours, said disk will, upon removal, disclose the relative times within that period when the retorts were charged, and contain records which will enable a ready computation to be had of the amount of each individual charge, and by comparing the record of the first and last charges, the difference will indicate the total net weight of the coal charged during the entire period of twenty-four hours.

As heretofore referred to, the printing action of the hammer 62 is provided by a solenoid 63. This printing action may be provided by the use of a button in the solenoid circuit, it being understood that the hammer is manipulated only after the counting mechanism has been moved to register the net weight of the charge. However, we prefer to provide this action automatically in order to include it in the automatic action controlled by the manipulation of the handle 13, and for this purpose, suitable connections may be provided, such for instance, as disclosed in Fig. 1, in which is disclosed a contact $b^5$ located in the path of movement of a projecting portion $15^x$ of the conductor $15^a$, said contact being connected to the solenoid through a lead $s$, the opposite lead for the solenoid indicated at $s'$, tapping the lead $g^2$. This arrangement causes the circuit for solenoid 63 to become momentarily energized during the period when the weight $w$ is traveling outward, a direction in which the counting mechanism is inactive; during this outward movement, the contact member $e$ is bridging the gap between contacts $d$ and $d'$. In this manner, the actuation of the counting mechanism will take place during the movement of the weight in one direction, while the recording of the registered amount will take place during the movement of the weight in the opposite direction, thus placing the registering and recording operations subject entirely to the manipulation of the handle 13 so that the entire operation of weighing, registering and recording is entirely separated from the control of the operator, whose functions are limited to manipulating the handle 13 at the proper time and in the manner herein set forth.

As will be understood, the movements of the handle 13 to provide the active positions of the circuit make and break devices, represented by the conductors 15, $15^a$, $15^b$ and 15ᶜ and the contacts with which they are adapted to coöperate, are in opposite directions in providing for the net weight registration, these movements being limited to these directions by the fingers 20ᵃ and 21ᵃ, these fingers becoming alternately inactive when the scale beam shifts from one extreme to the other of its movement. These beam movements represent load variations in opposite directions, as, for instance, where the sequence of load operations provides weighing of the gross load, followed by a removal of the desired portion of the load, then weighing the tare load, followed by augmenting the supply and thus increasing the load to the gross weight of the succeeding load; this sequence causes the weight travel to register the difference in weights and thus record the net weight. Should, however, this sequence be changed, as by removing a portion of the load, then weighing the tare, followed by removing an additional amount of the load (effecting load variations successively in the same direction), the direction of movement of the circuit make and break devices to activity would be successively in the same direction, since the scale beam would return to its former position after the second unloading operation. It will be clear, however, that no particular advantage is obtained by providing such intermediate weighing operation, so far as net weight registration is concerned, the net weight of the load being that of the load variations in opposite directions.

What we claim is:—

1. In weighing mechanism, a scale beam, permanently free to move to balance a weight shiftable thereon, an electric motor for shifting the weight, switch mechanism within the motor circuit for controlling the activity of the motor, and means for controlling the movements of the switch mechanism to close the motor circuit and including an auxiliary circuit having fixed contacts in the path of movement of the scale beam.

2. In weighing mechanism, a scale beam, permanently free to move to balance a weight shiftable thereon, an electric motor for shifting the weight, switch mechanism within the motor circuit for controlling the activity of the motor, and means for controlling the movements of the switch mechanism to close the motor circuit and including an auxiliary circuit having fixed contacts in the path of movement of the scale beam, said switch mechanism being operative to control the direction of movement of the motor, whereby the weight is shiftable to provide gross and tare weights from a single point.

3. In weighing mechanism, a scale beam, permanently free to move to balance a weight shiftable thereon, an electric motor for shifting the weight, switch mechanism within the motor circuit for controlling the activity of the motor, means for controlling the movements of the switch mechanism to close the motor circuit and including an auxiliary circuit having fixed contacts in the path of movement of the scale beam, said switch mechanism including a pivoted handle having a normal position, and circuit make and break devices movable with said handle, the operation of said devices being dependent upon the position of the scale beam relative to said contacts.

4. In weighing mechanism, a scale beam, permanently free to move to balance a weight shiftable thereon, an electric motor for shifting the weight, and switch mechanism within the motor circuit for controlling the activity of the motor, and means for controlling the movements of the switch mechanism to close the motor circuit and including an auxiliary circuit having fixed contacts in the path of movement of the scale beam, said switch mechanism including movable circuit make and break devices, the operation of said devices being dependent upon the position of the scale beam relative to said contacts.

5. In weighing mechanism, a scale beam, permanently free to move to balance a weight shiftable thereon, an electric motor for shifting the weight, and switch mechanism within the motor circuit for controlling the activity of the motor, and means for controlling the movements of the switch mechanism to close the motor circuit and including an auxiliary circuit having fixed contacts in the path of movement of the scale beam, said switch mechanism including movable circuit make and break devices, the operation of said devices being dependent upon the position of the scale beam relative to said contacts, the movement of said devices in one direction being at will.

6. In weighing mechanism, a scale beam, permanently free to move to balance a weight shiftable thereon, an electric motor for shifting the weight, and switch mechanism within the motor circuit for controlling the activity of the motor, and means for controlling the movements of the switch mechanism to close the motor circuit and including an auxiliary circuit having fixed contacts in the path of movement of the scale beam, said switch mechanism including movable circuit make and break devices, the operation of said devices being dependent upon the position of the scale beam relative to said contacts, the movement of said devices in one direction being controlled by the movements of the scale beam.

7. In weighing mechanism, a scale beam, permanently free to move to balance a weight shiftable thereon, an electric motor for shifting the weight, and switch mechanism within the motor circuit for controlling the activity of the motor, and means for controlling the movements of the switch mechanism to close the motor circuit and including an auxiliary circuit having fixed contacts in the path of movement of the scale beam, said switch mechanism including movable circuit make and break devices, the operation of said devices being dependent upon the position of the scale beam relative to said contacts, the movement of said devices in one direction being at will, the movement in the opposite direction being controlled by movements of the scale beam.

8. In weighing mechanism, a scale beam, permanently free to move to balance a weight shiftable thereon, an electric motor for shifting the weight, and switch mechanism within the motor circuit for controlling the activity of the motor, and means for controlling the movements of the switch mechanism to close the motor circuit and including an auxiliary circuit having fixed contacts in the path of movement of the scale beam, said switch mechanism including circuit make and break devices movable from inactive to active positions at will, said movements being controlled by the positions of the scale beam relative to said contact.

9. In weighing mechanism, a scale beam, a weight shiftable thereon, an electric motor for shifting the weight, switch mechanism within the motor circuit for controlling the activity of the motor, said switch mechanism including circuit make and break devices movable from inactive to active positions at will, and means whereby the direction of said movements are controlled by the position of the scale beam, said means including mechanism for controlling the length of travel of the devices.

10. In weighing mechanism, a scale beam, a weight shiftable thereon, an electric motor for shifting the weight, switch mechanism within the motor circuit for controlling the activity of the motor, said switch mechanism including circuit make and break devices movable from inactive to active positions at will, means whereby said movements are controlled by the positions of the scale beam, and means for temporarily retaining said devices in their active positions.

11. In weighing mechanism, a scale beam, a weight shiftable thereon, an electric motor for shifting the weight, switch mechanism within the motor circuit for controlling the activity of the motor, said switch mechanism including circuit make and break devices movable from inactive to active positions at will, movement-controlling mechanism for said devices, and means whereby the activity of said latter mechanism is dependent upon the position of the scale beam.

12. In weighing mechanism, a scale beam, a weight shiftable thereon, an electric motor for shifting the weight, switch mechanism within the motor circuit for controlling the activity of the motor, said switch mechanism including circuit make and break devices movable from inactive to active positions at will, movement-controlling mechanism for said devices, and means whereby the time of activity of said devices is controlled by the positions of the scale beam, the duration of activity being controlled by movements of the beam from such positions.

13. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and means whereby the direction of movement of the devices is controlled by the position of the beam.

14. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and means under the control of the scale beam for preventing successive movements of the devices in the same direction from the neutral under load variations in opposite directions.

15. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and means for selectively determining the direction of such movement and controlled by the scale beam.

16. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and means for selectively determining the direction of such movement and controlled by the scale beam, said means preventing successive movements of the devices in the same direction from the neutral under load variations in opposite directions.

17. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and means for selectively determining the direction of such movement and controlled by the scale beam, said latter means including locking mechanism for temporarily retaining said devices in the selected active position.

18. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and means for selectively determining the direction of such movement and controlled by the scale beam, said latter means including locking mechanism for temporarily retaining said devices in the selected active position, and means whereby said locking mechanism is rendered inactive by the balancing movements of the scale beam.

19. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and means for selectively determining the direction of such movement and controlled by the scale beam, said latter means including independent latch elements adapted to be rendered active or inactive by the movements of said devices.

20. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and means for selectively determining the direction of such movement and controlled by the scale beam, said latter means including independent latch elements adapted to be rendered active or inactive by the movements of said devices, the activity of said latch elements being non-concurrent when the beam is in either extreme of its movement.

21. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and means for selectively determining the direction of such movement and controlled by the scale beam, said means including independent latch mechanisms normally active during device-inactivity and adapted to be rendered inactive by movements of said devices to activity.

22. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, means for selectively determining the direction of such movement and controlled by the scale beam, said means including independent latch mechanisms normally active during device-inactivity and adapted to be rendered inactive by movements of said devices to activity, and means whereby the inactivity of the latch mechanism is dependent upon the position of the scale beam.

23. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, means for selectively determining the direction of such movement and controlled by the scale beam, said means including independent latch mechanisms normally active during device-inactivity and adapted to be rendered inactive by movements of said devices to activity, and means whereby said scale beam controls the inactivity of said latch mechanisms.

24. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, means for selectively determining the direction of such movement and controlled by the scale beam, said means including independent latch mechanisms normally active during device-inactivity and adapted to be rendered inactive by movement of said devices to activity, and means whereby said scale beam controls the inactivity of said latch mechanisms, the position of the beam selecting the latch mechanism to be rendered inactive.

25. In weighing mechanism, a scale beam, a weight shiftable thereon, an electric motor for shifting the weight, switch mechanism within the motor circuit for controlling the activity of the motor, said switch mechanism including circuit make and break devices movable from inactive to active positions at will, means whereby said movements are controlled by the positions of the scale beam, and normally inactive means for latching said devices in their active positions, said latching means being rendered active by movements of the devices to activity.

26. In weighing mechanism, a scale beam, a weight shiftable thereon, an electric motor for shifting the weight, switch mechanism within the motor circuit for controlling the activity of the motor, said switch mechanism including circuit make and break devices movable from inactive to active positions at will, means whereby said movements are controlled by the positions of the scale beam, normally inactive means for latching said devices in their active positions, and means whereby said latching means are rendered active by movements of the devices to activity, and said latching means being rendered inactive by movement of the scale beam to balancing position.

27. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, independent normally inactive latch mechanisms adapted to temporarily retain said devices active, and means whereby said latch mechanisms are rendered selectively active by movements of the devices to active position, said latter means being controlled to the scale beam.

28. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, independent normally inactive latch mechanisms adapted to temporarily retain said devices active, and means whereby said latch mechanisms are rendered selectively active by movements of the devices to active position, said latter means being controlled by the scale beam, a selected latch mechanism being rendered inactive by movements of the beam to balancing position.

29. In weighing mechanism, a scale beam, a weight shiftable thereon, an electric motor for shifting the weight, switch mechanism within the motor circuit for controlling the activity of the motor, said switch mechanism including circuit make and break devices movable from inactive to active positions at will, and latch mechanism for controlling such movements of the devices and for temporarily retaining the devices in such active positions, said latch mechanism including a normally active element for controlling the length of device-movement and a normally inactive element adapted to retain the device in active position, and means whereby said latter element is rendered active solely when the movement-limiting element is inactive.

30. In weighing mechanism, a scale beam, a weight shiftable thereon, an electric motor for shifting the weight, switch mechanism within the motor circuit for controlling the activity of the motor, said switch mechanism including circuit make and break devices movable from inactive to active positions at will, and latch mechanism for controlling such movements of the devices and for temporarily retaining the devices in such active positions, said latch mechanism including a normally active element for controlling the length of device-movement and a normally inactive element adapted to retain the device in active position, and means whereby said latter element is rendered active solely when the movement-limiting element is inactive, the shifting movements of said elements being in unison.

31. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and independent latch mechanisms for selectively controlling the direction and length of device-movement and for temporarily retaining the devices in activity, each latch mechanism including a normally active element for controlling the length of device movement and a normally inactive element adapted to retain the device in active position, and means whereby said latter element is rendered active solely when the movement-limiting element is inactive, the shifting movements of the elements being in unison.

32. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and independent latch mechanisms for selectively controlling the direction and length of device-movement and for temporarily retaining the devices in activity, each latch mechanism including a normally active element for controlling the length of device movement and a normally inactive element adapted to retain the device in active position, means whereby said latter element is rendered active solely when the movement-limiting element is inactive, the shifting movements of the elements being in unison, and means whereby the selection of latch mechanism element-shifting activity is controlled by positions of the scale beam.

33. In weighing mechanism, a scale beam, a weight shiftable thereon, an electric motor for shifting the weight, switch mechanism within the motor circuit for controlling the activity of the motor, said switch mechanism including circuit make and break devices movable in opposite directions to activity from a neutral point of inactivity, and independent latch mechanisms for selectively controlling the direction and length of device-movement and for temporarily retaining the devices in activity, each latch mechanism including a normally active element for controlling the length of device movement and a normally inactive element adapted to retain the device in active position, means whereby said latter element is rendered active solely when the movement-limiting element is inactive, the shifting movements of the elements being in unison, and means whereby the beam positions at the opposite extremes of beam movement select the latch mechanism to be rendered active for element shifting, the movement of the beam to balancing position rendering the selected mechanism inactive.

34. In weighing mechanism a scale beam, a weight shiftable thereon, an electric motor for shifting the weight, switch mechanism within the motor circuit for controlling the activity of the motor, said switch mechanism including circuit make and break devices for the motor circuit, said devices being normally inactive and comprising movable and stationary elements and means for controlling the movements of the movable elements to complete and maintain the motor circuit, said scale beam having make and break connections in the circuit to determine the activity of said latter means.

35. In weighing mechanism, a scale beam, a weight shiftable thereon, an electric motor for shifting the weight, switch mechanism within the motor circuit for controlling the activity of the motor, said switch mechanism including movable and stationary elements forming circuit make and break devices within the motor circuit, said movable elements being normally inactive and movable in opposite directions to activity from a neutral point of inactivity at will, means for controlling the direction of movement of the movable elements, said latter means also acting to temporarily retain the circuit make and break devices in activity, and means whereby the activity of said latter means is controlled by the position of the scale beam.

36. In weighing mechanism, a scale beam, a weight shiftable thereon, an electric motor for shifting the weight, switch mechanism within the motor circuit for controlling the activity of the motor, said switch mechanism including movable and stationary elements forming make and break devices for the motor circuit, said movable elements being normally inactive and movable from a position of inactivity in opposite directions at will, and latch mechanism controlled by the positions and movements of the scale beam for selecting the direction of movement of the movable elements temporarily maintaining the circuit completed, said latter mechanism including a member movable with the movable elements and having shoulders, and electrically-controlled latching members adapted to coöperate with said shoulders for locking said member to prevent movements of the movable element in one direction to complete the motor circuit or to permit such movement and to temporarily retain the motor circuit completed.

37. In computing weighing mechanism, a scale beam, a weight shiftable thereon, means for shifting said weight in opposite directions to provide for gross and tare weight balancing operations, a manual control for beginning the weighing operations, said control being operatively connected to the scale beam to permit operation solely when the beam is in a predetermined position, and computing mechanism bodily movable with the scale beam and operatively connected to said means to register the net weight by the travel of said weight in one direction.

38. In computing weighing mechanism, a balancing scale beam including a shiftable weight, motor-operated means for shifting the weight, switch mechanism for controlling the time and direction of movements of said means, means under the control of the scale beam for limiting the operation of the switch mechanism to movements providing shifting of the weight in the direction to balance the beam, and computing mechanism operatively connected to said shifting means for registering the travel of the weight in one direction.

39. In computing weighing mechanism, a balancing scale beam including a shiftable weight, motor-operated means for shifting the weight, switch mechanism for controlling the time and direction of movements of said means, means under the control of the scale beam for limiting the operations of the switch mechanism to movements providing shifting of the weight in the direction to balance the beam, and computing mechanism operatively connected to said shifting means for registering the travel of the weight in one direction, the connections between the means and the computing mechanism being adapted to translate the travel movements of the weight into weight units of measurement.

40. In computing weighing mechanism, a balancing scale beam including a shiftable weight, motor-operated means for shifting the weight, switch mechanism for controlling the time and direction of movements of said means, means under the control of the scale beam for limiting the operations of the switch mechanism to movements providing shifting of the weight in the direction to balance the beam, and computing mechanism operatively connected to said shifting means for registering the travel of the weight in one direction, said weight shifting means also including a threaded rod for moving the weight, said rod being geared to the computing mechanism to operatively drive said mechanism in one direction and run free with respect thereto in the opposite direction.

41. In weighing mechanism, a balancing scale beam including a shiftable weight, a rotatable member by which said weight is shifted, power-operated means for rotating said member at will, and mechanism between said means and said member for operatively connecting them at will and for automatically disconnecting them when the beam is balanced, said mechanism including means for braking said member to prevent weight over-running, whereby over-running of the power mechanism will be ineffective to shift the weight.

42. In weighing mechanism, a balancing scale beam including a shiftable weight, a rotatable member by which said weight is shifted, power-operated means for rotating said member at will, a manual control for beginning the weighing operations, said control being operatively connected to the scale beam to permit operation solely when the beam is in a predetermined position, and mechanism between said means and said member for operatively connecting them at will, said latter mechanism including a shiftable member movable into and out of operative engagement with the power means and rotatable member, and means whereby the movement of said shiftable member is controlled by the position of the scale beam.

43. In weighing mechanism, a balancing scale beam including a shiftable weight, a rotatable member by which said weight is shifted, power-operated means for rotating said member at will, and mechanism between said means and said member for operatively connecting them at will, said latter mechanism including a shiftable member movable into and out of operative engagement with the power means and rotatable member, and means whereby the movement of said shiftable member is controlled by the position of the scale beam, and also including brake mechanism adapted to prevent overrunning of the rotatable member when the shiftable member is disengaged.

44. In weighing mechanism, a balancing scale beam including a shiftable weight and a threaded rod operatively connected to and adapted to shift said weight, an electric motor and its circuit, circuit make and break devices within the circuit to make the circuit at will and automatically break it under movements of the scale beam, a manual control for beginning the weighing operations, said control being operatively connected to the scale beam to permit operations solely when the beam is in a predetermined position, and a normally inactive shiftable member adapted to operatively engage and disengage said motor and said threaded rod, the movement of the shiftable member to such engagement being dependent upon the completion of the motor circuit through said devices.

45. In a weighing mechanism, a balancing scale beam including a shiftable weight and a threaded rod operatively connected to and adapted to shift said weight, an electric motor and its circuit, circuit make and break devices within the circuit to make the circuit at will and automatically break it under movements of the scale beam, a manual control for beginning the weighing operations, said control being operatively connected to the scale beam to permit operations solely when the beam is in a predetermined position, and a normally inactive shiftable member adapted to operatively engage and disengage said motor and said threaded rod, the movement of the shiftable member to such engagement being dependent upon the completion of the motor circuit through said devices, the disengagement being coincident with the break of said circuit.

46. In weighing mechanism, a balancing scale beam, including a shiftable weight and a threaded rod operatively connected to and adapted to shift said weight, an electric motor and its circuit, circuit make and break devices within the circuit to make the circuit at will and automatically break it under movements of the scale beam, and a normally inactive shiftable member adapted to operatively engage and disengage said motor and said threaded rod, means whereby the movement of the shiftable member to such engagement and its maintenance in engagement is dependent upon the completion of the motor circuit through said devices, the disengagement being coincident with the break of said circuit, and brake mechanism coöperating with said threaded member to prevent over-running of the weight when disengagement is had.

47. In computing weighing mechanism, a balancing scale beam including a shiftable poise, a motor for shifting the poise in either direction, mechanism for controlling the direction of movement of the motor, computing weighing mechanism correlated with the poise-moving means to register the movements of the poise, and mechanism for recording the registered weight, said mechanism including means for actuating the recording mechanism and for controlling the operation of the recording mechanism by the controlling mechanism.

48. In computing weighing mechanism a balancing scale beam including a shiftable poise, a motor for shifting the poise in either direction, mechanism for controlling the direction of movement of the motor, computing weighing mechanism correlated with the poise-moving means to register the movements of the poise in one direction, and mechanism for recording the registered weight, said mechanism including means for actuating the recording mechanism and for controlling the operation of the recording mechanism by the controlling mechanism.

49. In computing weighing mechanism, a balancing scale beam including a shiftable weight, a motor for shifting the weight in either direction, mechanism for controlling the movements of the motor, computing mechanism adapted to register the movements of the weight in one direction, and mechanism for recording the registered weight, said controlling mechanism being adapted to control the activity of said recording mechanism, said recording mechanism being active during the movement of the weight in the opposite direction.

50. In weighing mechanism, a balancing scale beam including a shiftable poise, a motor for shifting the poise in either direction, and switch mechanism within the motor circuit for controlling the activity of the motor, said switch mechanism including circuit make-and-break devices under the control of the scale beam and movable in a plurality of directions from inactive to active positions at will to control the direction of poise travel, said device and the beam control including means for automatically selecting the direction of device movement to cause the poise to travel toward the point of balance.

51. In weighing mechanism, a balancing scale beam including a shiftable poise a motor for shifting the poise in either direction, and switch mechanism within the motor circuit for controlling the activity of the motor, said switch mechanism including circuit make-and-break devices under the control of the scale beam and movable in a plurality of directions from inactive to active positions at will to control the direction of poise travel, said device and the beam control including means for automatically selecting the direction of device movement to cause the poise to travel toward the point of balance automatically.

In testimony whereof we affix our signatures in presence of two witnesses.

HENRY A. CARPENTER.
ARTHUR W. WARNER.

Witnesses:
W. G. DOOLITTLE,
F. E. GAITHER.

---

Corrections in Letters Patent No. 1,156,864.

It is hereby certified that in Letters Patent No. 1,156,864, granted October 12, 1915, upon the application of Henry A. Carpenter and Arthur W. Warner, of Sewickley, Pennsylvania, for an improvement in "Computing Weighing Apparatus," errors appear in the printed specification requiring correction as follows: Page 7, lines 37, 48, 63, 79, 94, 110, and 127, page 8, line 15, claims 1–8, after the word "beam" strike out the comma; page 7, lines 38, 49, 64, 80, 95, 111, and 128, page 8, line 16, claims 1–8, after the word "balance" insert a comma; and that the said Letters Patent should be read with these corrections therein that the same may conform to the record of the case in the Patent Office.

Signed and sealed this 18th day of January, A. D., 1916.

[SEAL.]

J. T. NEWTON,
*Acting Commissioner of Patents.*

Cl. 73—100.